US00RE41384E

(19) United States
(12) Reissued Patent
House

(10) Patent Number: US RE41,384 E
(45) Date of Reissued Patent: Jun. 22, 2010

(54) DIPOLE SPEAKER HEADRESTS

(75) Inventor: William Neal House, Falls of Rough, KY (US)

(73) Assignee: Harman International Industries, Incorporated, Northridge, CA (US)

(21) Appl. No.: 12/430,617

(22) Filed: Apr. 27, 2009

Related U.S. Patent Documents

Reissue of:
(64) Patent No.: 5,887,071
Issued: Mar. 23, 1999
Appl. No.: 08/693,399
Filed: Aug. 7, 1996

(51) Int. Cl.
*H04R 25/00* (2006.01)

(52) U.S. Cl. ..... 381/386; 381/332; 381/389; 381/87

(58) Field of Classification Search ..... 381/86, 381/87, 301, 302, 332, 333, 336, 386, 388, 381/389; 181/141, 145, 199
See application file for complete search history.

(56) References Cited

U.S. PATENT DOCUMENTS

| | | | |
|---|---|---|---|
| 2,452,103 | A | 10/1948 | Conradt et al. |
| 2,501,993 | A | 3/1950 | Conradt |
| 2,527,656 | A | 10/1950 | Reinsdorf |
| 2,710,662 | A | 6/1955 | Camras |
| 2,802,906 | A | 8/1957 | Goldenberg et al. |
| 2,908,766 | A | 10/1959 | Taylor |
| 3,156,500 | A | 11/1964 | Kerr |
| 3,385,393 | A | 5/1968 | Gold |
| 3,512,605 | A | 5/1970 | McCorkle |
| 3,556,088 | A | 1/1971 | Leonardini |
| 3,880,152 | A | 4/1975 | Nohmura |
| 3,918,551 | A | 11/1975 | Rizo-Patron |
| 3,944,020 | A | 3/1976 | Brown |
| 3,976,162 | A | 8/1976 | Cummings |
| 4,020,284 | A | 4/1977 | Phillips |
| 4,023,566 | A | 5/1977 | Martinmaas |
| 4,025,724 | A | 5/1977 | Davidson, Jr. et al. |
| 4,027,112 | A | 5/1977 | Heppner et al. |
| 4,038,499 | A | 7/1977 | Yeaple |
| 4,042,791 | A | 8/1977 | Wiseman |
| 4,055,170 | A | 10/1977 | Nohmura |
| 4,061,877 | A | 12/1977 | Phillips |
| 4,064,376 | A | 12/1977 | Yamada |
| 4,075,438 | A | 2/1978 | Kappel |

(Continued)

FOREIGN PATENT DOCUMENTS

| | | | |
|---|---|---|---|
| DE | 198 40 444 | A1 | 5/1999 |
| EP | 0 993 230 | A2 | 4/2000 |
| GB | 827306 | | 2/1960 |
| JP | 3132198 | | 6/1991 |
| JP | 1995-264689 | A | 10/1995 |

OTHER PUBLICATIONS

European Search Report dated Dec. 18, 2002 for Application No. 97 932 565.1–2411, 5 pgs.
International Search Report dated Aug. 29, 1997 for Application No. 1039–28613, 2 pgs.

*Primary Examiner*—Huyen D Le
(74) *Attorney, Agent, or Firm*—Brinks Hofer Gilson and Lione

(57) ABSTRACT

A sound reproduction unit comprises a central, head receiving portion and opposite first and second ends. The first and second ends have opposed front and back surfaces. A first acoustic transducer is mounted within the first end and a second acoustic transducer is mounted within the second end. First, second, third and fourth acoustically substantially transparent pathways are provided between the first transducer and the front surface of the first end, the first transducer and the back surface of the first end, the second transducer and the front surface of the second end, and between the second transducer and the back surface of the second end, respectively.

6 Claims, 1 Drawing Sheet

U.S. PATENT DOCUMENTS 4,124,249 A 11/1978 Abbeloos
4,156,117 A 5/1979 Phillips
4,210,784 A 7/1980 Phillips
4,289,936 A 9/1981 Civitello
4,310,307 A 1/1982 Bellisario
4,354,067 A 10/1982 Yamada et al.
4,440,443 A 4/1984 Nordskog
4,490,842 A 12/1984 Watanabe
D277,630 S 2/1985 Olson et al.
4,565,405 A 1/1986 Mayer
4,638,884 A 1/1987 Lee
4,641,345 A 2/1987 Takahashi
4,696,370 A 9/1987 Tokumo et al.
4,758,047 A 7/1988 Hennington
4,778,027 A 10/1988 Taylor
4,797,934 A 1/1989 Hufnagel
4,866,776 A 9/1989 Kasai et al.
4,868,888 A 9/1989 Dayton
4,877,105 A 10/1989 Mugikura
4,979,777 A 12/1990 Takada
4,991,222 A 2/1991 Nixdorf
5,101,810 A 4/1992 Skille et al.
5,113,852 A 5/1992 Murtonen
5,143,055 A 9/1992 Eakin
5,147,109 A 9/1992 Jolly
5,191,177 A 3/1993 Chi
5,193,118 A 3/1993 Latham-Brown et al.
5,199,075 A 3/1993 Fosgate
5,243,640 A 9/1993 Hadley et al. ..... 379/59
5,301,237 A 4/1994 Fosgate
5,314,403 A 5/1994 Shaw
5,318,340 A 6/1994 Henry ..... 297/232
5,387,026 A 2/1995 Matsuhashi et al.
5,398,992 A 3/1995 Daniels
D361,674 S 8/1995 Carter, Sr.
5,482,352 A 1/1996 Leal et al.
5,608,806 A 3/1997 Hinojosa
5,687,246 A 11/1997 Lancon
5,692,058 A 11/1997 Eggers et al. ..... 381/107
5,910,996 A 6/1999 Eggers et al. ..... 381/107

DIPOLE SPEAKER HEADRESTS

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to sound systems. It is disclosed in the context of a loudspeaker mounting for a vehicle, but is believed to be useful in other contexts as well.

In the field of sound systems, numerous proposals have been made to mount system components, for example, loudspeakers in seat headrests. There are, for example, the systems disclosed in the following U.S. Pat. Nos.: 2,452,103; 2,501,993; 2,527,656; 2,908,766; 3,156,500; 3,385,393; 3,512,605; 3,944,020; 3,976,162; 4,027,112; 4,038,499; 4,042,791; 4,310,307; 4,440,443; 4,490,842; 4,565,405; 4,638,884; 4,696,370; 4,797,934; 4,991,222; 5,482,352; D277,630; and, D361,674; and British Patent Specification 827,306. There are also the systems disclosed in the following U.S. Pat. Nos.: 2,710,662; 3,918,551; 4,025,724; 4,289,936; 5,191,177; 5,199,075; and, 5,301,237.

A sound reproduction unit comprises a central, head receiving portion, and opposite first and second ends having opposed front and back surfaces. Means are provided for mounting a first acoustic transducer within the first end. Further means are provided for mounting a second acoustic transducer within the second end. Additional means provide between the first acoustic transducer and the front surface of the first end a first acoustically substantially transparent pathway, between the first acoustic transducer and the back surface of the first end a second acoustically substantially transparent pathway, between the second acoustic transducer and the front surface of the second end a third acoustically substantially transparent pathway, and between the second acoustic transducer and the back surface of the second end a fourth acoustically substantially transparent pathway.

According to an illustrative embodiment, the first transducer comprises a first loudspeaker having opposed first front and second rear radiating surfaces. The first pathway is defined between the first radiating surface and the front of the first end and the second pathway is defined between the second radiating surface and the back of the first end. The second transducer comprises a second loudspeaker having opposed third front and fourth rear radiating surfaces. The third pathway is defined between the third radiating surface and the front of the second end and the fourth pathway is defined between the fourth radiating surface and the back of the second end.

Further according to an illustrative embodiment, the head receiving portion defines a first longitudinal axis and the first end defines a second longitudinal axis, and the first and second axes define between them an angle $\alpha$ greater than 0° and less than or equal to 90°.

Additionally according to an illustrative embodiment, the second end defines a third longitudinal axis, and the first and third axes define between them an angle $\beta$ greater than 0° and less than or equal to 90°.

According to an illustrative embodiment, the sound reproduction unit further comprises means for mounting the unit on an automotive vehicle seat.

BRIEF DESCRIPTION OF THE DRAWINGS

The invention may best be understood by referring to the following detailed description and accompanying drawings which illustrate the invention. In the drawings.

DETAILED DESCRIPTION OF AN ILLUSTRATIVE EMBODIMENT

Figure 1:
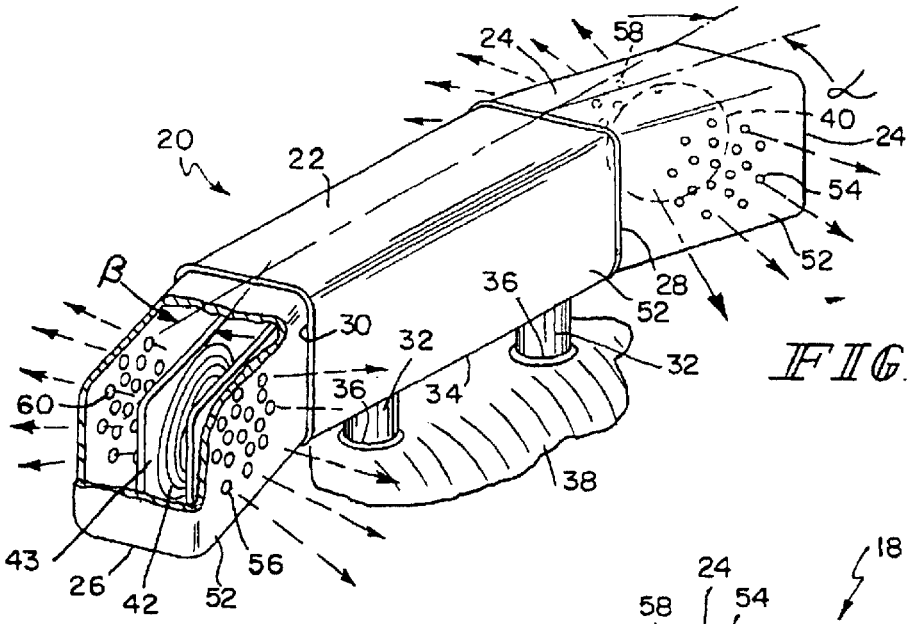
FIG. 1 illustrates a perspective view of a vehicle headrest incorporating the invention.

Referring now to FIG. 1, an automotive vehicle 18 headrest 20 for use on the driver's and front seat passenger's seats includes a central head-receiving region 22 and left and right wings 24, 26, respectively, which project outwardly from the opposite left and right ends 28, 30, respectively, of region 22 and somewhat forwardly therefrom at angles $\alpha$ and $\beta$ to the longitudinal extent of central region 22, $0° \leqq \alpha \leqq 90°$, $0° \leqq \beta \leqq 90°$. Although angles $\alpha$ and $\beta$ are illustrated as being substantially the same, these angles may be different from each other and typically are dictated by, inter alia, the internal dimensions of the vehicle 18 listening environment in accordance with the below explained principles. (An) appropriate mounting(s) 32 extend(s) downwardly from the bottom 34 of central region 22 for engagement by a complementary mounting 36 in the upper back 38 of each of the driver's and front seat passenger's seats.

The wings 24, 26 are provided with separate moving coil loudspeakers 40, 42, respectively, which are mounted in appropriate baffles 43 and are coupled to the left and right channels 44, 46, respectively, of the sound system 48 with which the vehicle 18 is equipped by appropriate conductors 50. The covering 52 with which the headrests 20 are upholstered is provided with left and right forward vents 54, 56, respectively, which are acoustically substantially transparent to the program material reproduced by loudspeakers 40, 42, as is conventional in the prior art. In addition, rearwardly facing left and right vents 58, 60 also provided in headrests 20 to vent the rearward sides of loudspeakers 40, 42. Vents 58, 60 are also upholstered with material which is acoustically substantially transparent to the program material being reproduced by loudspeakers 40, 42.

Figure 2:
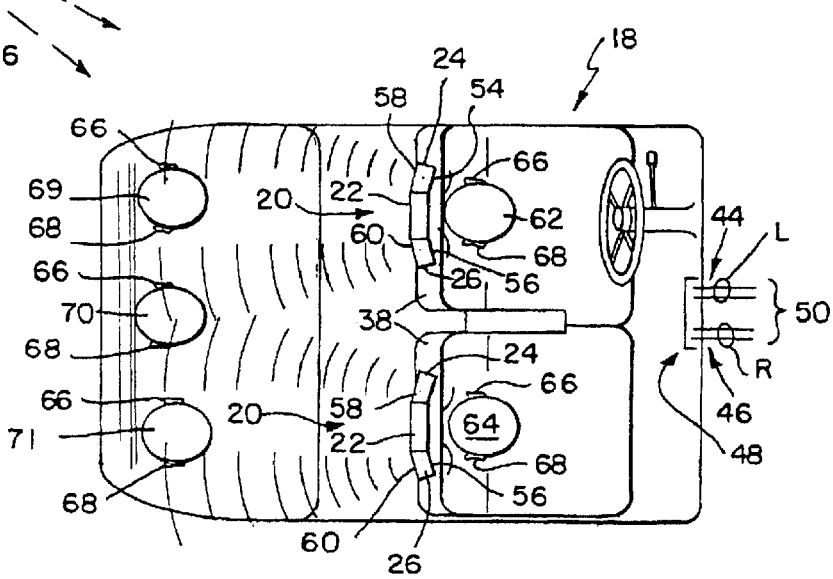
FIG. 2 illustrates a top plan view of an aspect of a vehicle sound system incorporating headrests according to FIG. 1 in a typical passenger car layout; and, FIG. 3 illustrates a side elevational view of an aspect of a vehicle sound system incorporating headrests according to FIGS. 1–2 in a typical passenger car layout.
Figure 3:
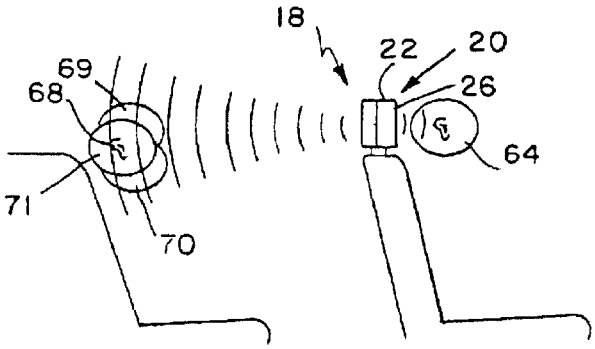

Referring to FIGS. 2–3, it will be appreciated that each of the driver 62 and front seat passenger 64 will receive at his left ear 66 substantially only the signal reproduced by loudspeaker 40 and will receive at his right ear 68 substantially only the signal reproduced by loudspeaker 42. The left and right rear seat passengers 69, 71, respectively, will also, by virtue of vents 58, 60, receive at their left ears 66 substantially only the signals reproduced by their respective loudspeakers 40 and at their right ears 68 substantially only the signals reproduced by their loudspeakers 42. These signals will be 180° out of phase with the signals from loudspeakers 40, 42 reaching the ears 66, 68, respectively, of the driver 62 and front seat passenger 64.

In addition, should a passenger 70 be occupying the middle position of the rear seat, passenger 70 will also be directly exposed to the separated, reproduced left loudspeaker 40 and right loudspeaker 42 signals, although these signals will be 180° out of phase with the same signals as heard by the driver 62 and front seat passenger 64. In addition, the signal from the back of the left loudspeaker 40 of the front seat passenger 64's headrest 20 will impinge upon the rear middle seat passenger 70's right ear 68 and the signal from the back of the right loudspeaker 42 of the driver 62's headrest 20 will impinge upon the rear middle seat passenger 70's left ear 66. To summarize then: the driver 62 hears the right signal, R, in his right ear 68 and the left signal L in his left ear 66; the front seat passenger 64 hears the right signal, R, in his right ear 68 and the left signal L in his left ear 66; the left and right rear passengers 69, 71, respectively, hear the negative of the right signal, −R, in their respective right ears 68 and the negative of the left signal, −L, in their respective left ears 66, owing to the 180° phase reversal of the back radiated signals from loudspeakers 40, 42. Finally, the rear middle seat passenger 70 will hear the negative of the right signal, −R, in his left ear 66, and the negative of the left signal, −L, in his right ear 68.

Thus, although there will be phase reversal for the rear seat passengers 69, 70, 71, and the middle rear seat passenger 70 will hear the left program material (−L) in his right ear 68 and the right program material (−R) in his left ear 66, separation between the left and right channels will be substantially maintained for all of listeners 62, 64, 69, 70, 71. And, because of the relatively close, substantially ear-level spacing of the loudspeakers 40, 42 to all of the listeners 62, 64, 69, 70, 71 and particularly to the front seat listeners 62, 64, direct radiated program material will predominate substantially over longer path (echo and the like) program material, and so crosstalk and head related transfer functions should not contribute substantial ambiguity to, or otherwise degrade substantially, the separation and localization of the left and right sound sources by the listeners 62, 64, 69, 70, 71.

What is claimed is:

1. A sound reproduction unit comprising a central, head receiving portion, opposite first and second ends, the first end having opposed front and back surfaces, the second end having opposed front and back surfaces, means for mounting within the first end a first [acoustic transducer] *loudspeaker having opposed first front and second rear radiating surfaces*, means for mounting within the second end a second [acoustic transducer] *loudspeaker having opposed third front and fourth rear radiating surfaces*, a first port connecting the first [acoustic transducer] *loudspeaker* and the front surface of the first end to provide a first acoustically substantially transparent pathway *between the first front radiating surface and the front surface of the first end*, a second port connecting the first [acoustic transducer] *loudspeaker* and the back surface of the first end to provide a second acoustically substantially transparent pathway *between the second rear radiating surface and the back surface of the first end*, a third port connecting the second [acoustic transducer] *loudspeaker* and the front surface of the second end to provide a third acoustically substantially transparent pathway *between the third front radiating surface and the front surface of the second end*, and a fourth port connecting the second [acoustic transducer] *loudspeaker* and the back surface of the second end to provide a fourth acoustically substantially transparent pathway *between the fourth rear radiating surface and the rear surface of the second end*.

[2. The apparatus of claim 1 wherein the first transducer comprises a first loudspeaker having opposed first front and second rear radiating surfaces, the front pathway defined between the first radiating surface and the front of the first end and the second pathway defined between the second radiating surface and the back of the first end, the second transducer comprises a second loudspeaker having opposed third front and fourth rear radiating surfaces, the third pathway defined between the third radiating surface and the front of the second end and the fourth pathway defined between the fourth radiating surface and the back of the second end.]

3. The apparatus of claim 1 wherein the head receiving portion defines a first longitudinal axis and the first end defines a second longitudinal axis, and the first and second axes define between them a first angle greater than 0° and less than or equal to 90°.

4. The apparatus of claim 3 wherein the second end defines a third longitudinal axis and the first and third axes define between them a second angle greater than 0° and less than or equal to 90°.

[5. The apparatus of claim 2 wherein the head receiving portion defines a first longitudinal axis and the first end defines a second longitudinal axis, and the first and second axes define between them a first angle greater than 0° and less than or equal to 90°.]

[6. The apparatus of claim 5 wherein the second end defines a third longitudinal axis and the first and third axes define between them a second angle greater than 0° and less than or equal to 90°.]

7. The apparatus of claim 1 and further comprising means for mounting the unit on an automotive vehicle seat.

[8. The apparatus of claim 2 and further comprising means for mounting the unit on an automotive vehicle seat.]

9. The apparatus of claim 3 and further comprising means for mounting the unit on an automotive vehicle seat.

10. The apparatus of claim 4 and further comprising means for mounting the unit on an automotive vehicle seat.

[11. The apparatus of claim 5 and further comprising means for mounting the unit on an automotive vehicle seat.]

[12. The apparatus of claim 6 and further comprising means for mounting the unit on an automotive vehicle seat.]

* * * * *